United States Patent [19]

Ackeret

[11] Patent Number: 4,538,729
[45] Date of Patent: Sep. 3, 1985

[54] RECORDING MEDIA STORAGE APPARATUS AND TECHNIQUE

[75] Inventor: Peter Ackeret, Kusnacht, Switzerland

[73] Assignee: Idn Inventions and Development of Novelties Ag, Chur, Switzerland

[21] Appl. No.: 645,068

[22] Filed: Aug. 28, 1984

[30] Foreign Application Priority Data

Aug. 29, 1983 [EP] European Pat. Off. ........ 83108472.8

[51] Int. Cl.³ .......................................... B65D 85/672
[52] U.S. Cl. .................................... 206/387; 220/347;
220/348; 312/319
[58] Field of Search ................ 206/387; 220/345, 346,
220/347, 348, 351; 312/13, 319

[56] References Cited

U.S. PATENT DOCUMENTS

| Re. 30,184 | 1/1980 | Ackeret | 206/387 |
|---|---|---|---|
| 3,371,976 | 3/1968 | Ritz, Jr. | 206/387 |
| 3,651,700 | 3/1972 | Bailey . | |
| 3,904,259 | 9/1975 | Hoffmann et al. | 206/387 |
| 3,994,551 | 11/1976 | Ackeret | 312/319 |
| 3,995,921 | 12/1976 | Ackeret | 206/387 |
| 4,113,091 | 9/1978 | Ackeret | 206/387 |
| 4,216,857 | 8/1980 | Huang | 206/387 |
| 4,401,216 | 8/1983 | Koch | 206/387 |

FOREIGN PATENT DOCUMENTS

2521371 11/1976 Fed. Rep. of Germany .
7922024 6/1979 Fed. Rep. of Germany .
2274109 3/1975 France .

Primary Examiner—Joseph Man-Fu Moy

[57] ABSTRACT

In a container for use in the storage of recording media, the container comprising a housing and at least one transport slider which receives the recording media and which is movable in the housing between an inserted and a recording media removal position, the transport slider is locked against the bias of an ejection spring by cooperating coupling and cam members. Unlocking is accomplished by moving the transport slider in the insertion direction from the locked position while locking is accomplished by moving the transport slider in the insertion direction until resistance to further insertion is encountered. The locking mechanism does not employ any spring elements which are in a stressed condition in either the locked or unlocked positions.

36 Claims, 20 Drawing Figures

RECORDING MEDIA STORAGE APPARATUS AND TECHNIQUE

BACKGROUND OF THE INVENTION (1) Field of the Invention

The present invention relates to the storage of recording media. More specifically, this invention is directed to apparatus for holding, and presenting upon command, recording media and especially to methods of and devices for releasably latching media receiving slider members in such magazines. Accordingly, the general objects of the present invention are to provide novel and improved methods and apparatus of such character.

(2) Description of the Prior Art

Magazines for storing recording media, such as magnetic tape cassettes, discettes and audio or video discs, are well known in the art. By way of example, a device for storing compact cassettes is disclosed in U.S. Pat. No. 4,046,255. The patented device includes a housing, at least a first transport slider member which is received in the housing and which is designed to accommodate the cassette, a spring for biasing the slider member to the ejected position where the cassette is presented for removal and use and a releasable locking mechanism for normally retaining the slider member in the inserted position in the housing against the bias of the spring. In the apparatus of U.S. Pat. No. 4,046,255 the locking mechanism includes a hook-like locking element which forms part of the slider member. This element is resiliently deformed during locking and remains in a stressed condition when in the locked position. The locking element will spring back to a release position during the unlocking, i.e., ejection, procedure. In the interest of minimizing manufacturing cost, it is customary to fabricate the locking element from a plastic material. However, this results in unreliable operation since the plastic materials which are otherwise suitable for use have a tendency to cold flow as a result of constantly applied stresses. Any such cold flow will result in the spring bias of the locking element being lost. Further, such normally stressed plastic locking elements will fail at high temperatures. Since recording media storage devices are often for installed in motor vehicles, where temperatures on the order of 80° C. must be taken into consideration, apparatus of the type disclosed in U.S. Pat. No. 4,046,255 have been found to be unsuitable for such usage.

Another example of a storage device for compact cassettes may be seen from FIGS. 5-8 of U.S. Pat. No. 3,995,921. The storage device of this patent does not employ a slider member. Rather, a spring arrangement directly biases the cassette in the direction of ejection. The spring arrangement is locked at a guide projection of the housing of the device and remains stressed toward the unlocked position. The apparatus of U.S. Pat. No. 3,995,921 has the disadvantages that the cassette is inadequately protected and the spring arrangement is relatively complicated and, therefore, expensive. Further, again considering the possibility of motor vehicle installation, the locking mechanism is unreliable, and particularly is not resistant to vibration as a result of the very small surface areas which are engaged in the locked position.

Yet another device for storing compact cassettes is disclosed in U.S. Pat. No. 3,836,222. The device of this patent has a comparatively complicated locking mechanism wherein the steps of locking and unlocking do not automatically follow alternatively one after the other as is desirable, particularly in a motor vehicle installation where the device should be capable of operation without prolonged eye contact. In the apparatus of U.S. Pat. No. 3,836,222 the locked or unlocked condition depends upon the degree of insertion travel of a transport slider member and, accordingly, the locking mechanism is somewhat unreliable in addition to being difficult to use.

SUMMARY OF THE INVENTION

The present invention overcomes the above-briefly discussed and other deficiencies and disadvantages of the prior art and in so doing, provides a novel and improved device for storing recording media and a unique method for locking and unlocking a storage media receiving transport slider in such device. A locking mechanism for a device in accordance with the present invention is not dependent for operation on position, is resistant to vibration, has no spring elements which are in a stressed condition in either the locked or ejected positions, employs relatively large surface areas to define the locked position is characterized by short travel during the actual locking and unlocking procedures, is simply constructed, can be readily assembled and can be used in various types of device.

Apparatus in accordance with the invention includes a housing which will typically have a substantially rectangular shape when viewed in cross-section. The apparatus will also include at least a first transport slider member designed to accommodate the recording media to be stored. The transport slider member is arranged for movement in the housing and, upon release, conveys the recording media from an inserted storage position in which it is completely enclosed in the housing to an ejected removal position where it can be comfortably grasped and lifted from the slider member by the user. The apparatus also includes a spring arrangement which biases the transport slider member toward the removal position. The apparatus further comprises a locking mechanism having the above-recited characteristics. The locking mechanism includes cooperating components on the housing and transport slider member which function to positively lock the slider member in the housing when it is pushed in the insertion direction. The locking mechanism further functions to unlock the transport slider member, whereupon it will move to the removal position under the influence of the biasing spring, when the slider member is pushed in the insertion direction a second time. The alternate locking and unlocking incident to pushing the slider member in the same direction results, in part, from the employment of a coupling member which can be pivoted and/or displaced. This coupling member may be either mounted on the housing or carried by the transport slider member. The coupling member does not have a preferred position, resulting from spring bias. Rather, the coupling member substantially freely follows guide surfaces on a cooperating portion of the locking mechanism. Thus, the functions of "guiding" and "locking" are, in accordance with the present invention, structurally separated from one another and this separation permits employment of relatively large surface areas for positive locking in the case of short travel. This arrangement also permits the locking mechanism to be compact and fabricated from plastic material.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which.

DESCRIPTION OF THE DISCLOSED EMBODIMENTS

Figure 1:
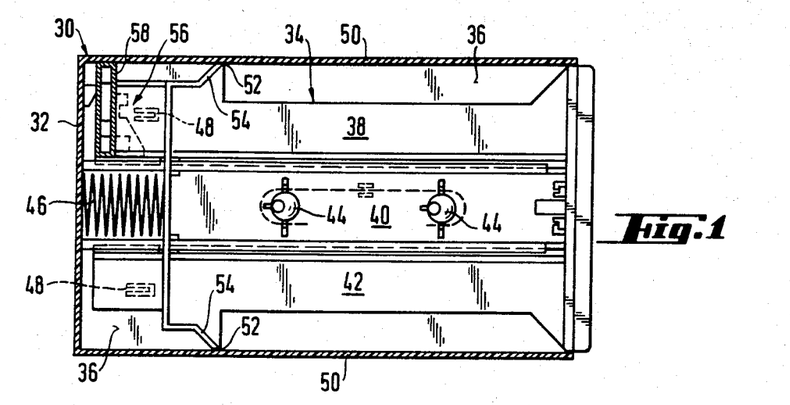
FIG. 1 is a top plan view, partly in section, of a container for storing a compact cassette in accordance with a first embodiment of the present invention.

Referring first to FIG. 1, a container or magazine for storing compact cassettes is shown in a cross-sectional top plan view. This container includes a substantially cuboid housing, indicated generally at 30, having a rear wall 32. Housing 30 is open at the end thereof opposite to wall 32. A transport slider member, indicated generally at 34, is received in housing 30 and is movable between an inserted position, where it is depicted in the drawing, and an ejected or cassette removal position wherein it extends out through the open end of housing 30. The slider member 34 is guided along rails which are integral with the base 36 of housing 30. The slider member 34 may comprise one or more base plates. In the embodiment of FIG. 1, slider member 34 includes three parallel base plates 38, 40 and 42 which cooperate with the integral internal guide rails of housing 30. The central base plate 40 has a pair of laterally displacable resilient retaining projections 44 which engage the winding hubs of a cassette inserted in the slider member. Projections 44 hold the winding hubs of the cassette in position, i.e., the projections restrain the hubs from rotation. A helical spring 46 extends between rear wall 32 of housing 30 and the transport slider member and biases the slider member toward the removal position. In the removal or ejected position, the edges 52 of the guide plates 54 of the transport slider member, which edges are guided by the oppositely disposed side walls 50 of housing 30, will be juxtapositioned to the open end of housing 30. The base 36 of housing 30 also includes a pair of integral stops 48 which limit the insertion of the transport slider member into the housing. When in the inserted position, as shown in FIG. 1, the transport slider member 34 is locked by means of a locking mechanism 56 which will be described in detail below.

Figure 4:
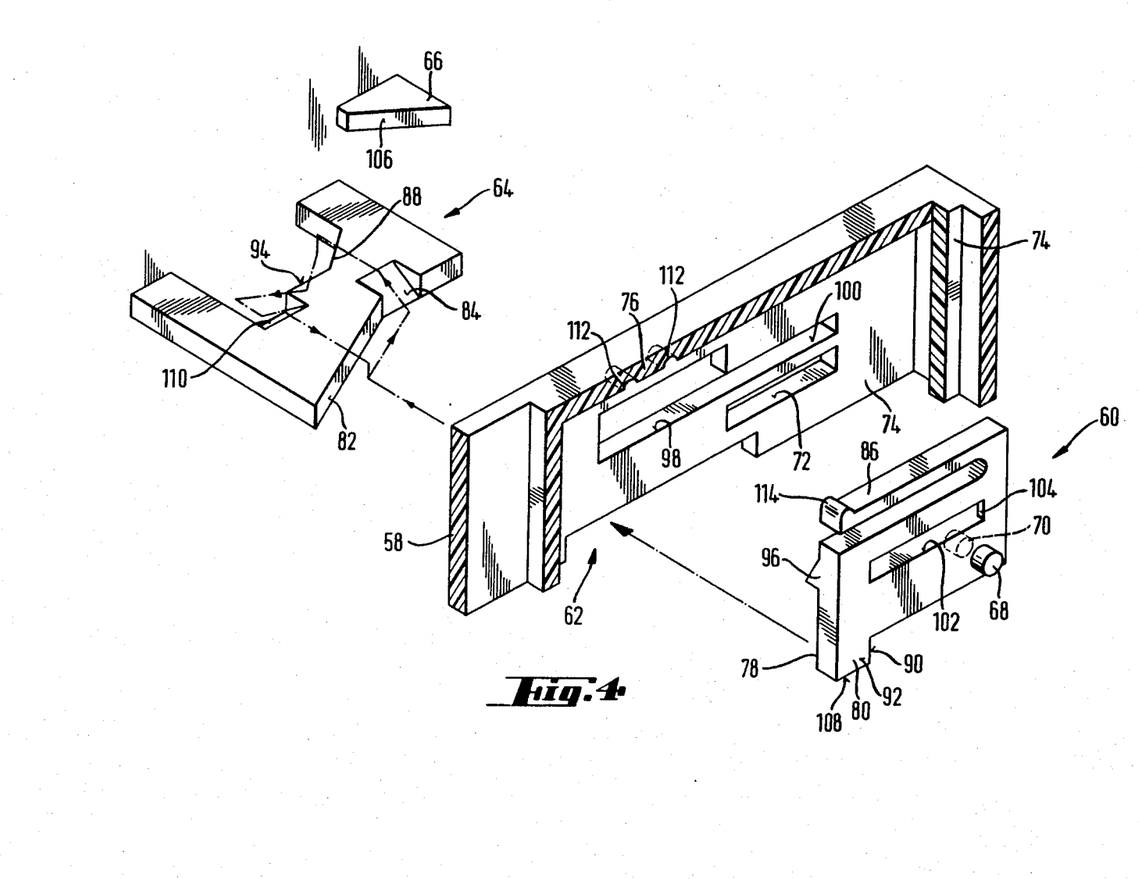
FIG. 4 is an exploded perspective view of the components of the locking mechanism of the embodiment of FIG. 1.
Figure 5:
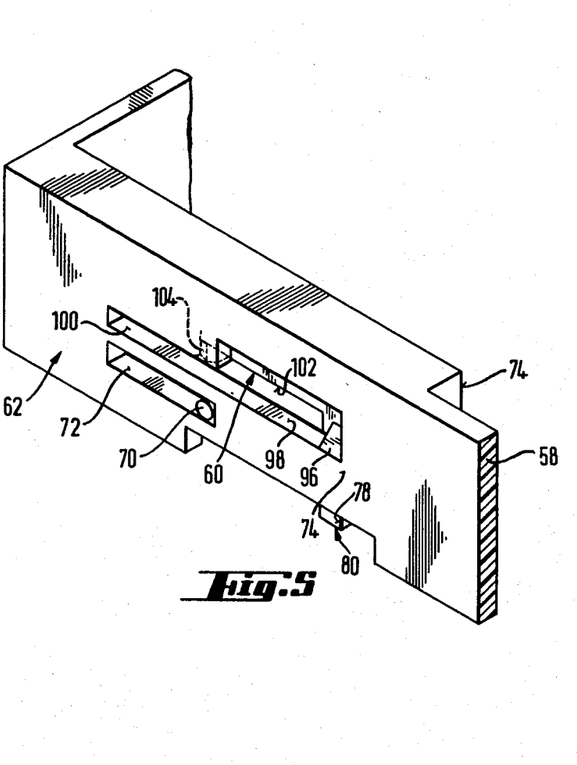
FIG. 5 is a partial view, taken from a different perspective, of one of the components shown in FIG. 4.
Figure 6:
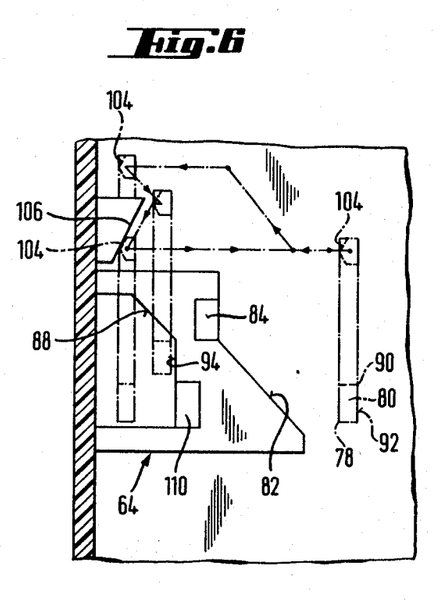
FIG. 6 is a diagramatic plan view which represents the operation of the locking mechanism components shown in FIG. 4.

Referring now to FIGS. 4-6 in conjunction with FIG. 1, the locking mechanism 56 generally comprises a catch 60, a catch guide 62, a camming plate 64 and a control projection 66. To facilitate understanding of the invention, it may be presumed that the catch 60 and catch guide 62 are part of the transport slider member 34 while the camming plate 64 and control projection 66 are arranged on housing 30. It is, however, to be understood that this arrangement may be reversed if it appears advantageous to do so, i.e., the catch 60 and guide 62 may be mounted on the housing and the camming plate 64 and control projection 66 would then be part of the transport slider member.

The catch guide 62 is, in the embodiment being described, formed in the rear end wall 58 of the transport slider member 34. In this regard, it is to be noted that the catch guide 62 is only partially depicted in FIGS. 4 and 5, i.e., in FIG. 4 the second of a pair of spaced parallel walls 74 has been cut away in the interest of facilitating understanding of the invention. The catch guide 62 also includes a cover cross-piece 76.

The catch 60 comprises a substantially flat molded plastic part having a generally rectangular shape. Catch 60 includes a pair of oppositely extending coaxial pins 68, 70 which are integral therewith. The pins 68 and 70 engage respective slots 72 in the guide plates 74 of catch guide 62. This arrangement permits the catch 60 to both move from side to side and to pivot about the axis of pins 68, 70. The catch 60 will be located, for movement, in the space between guide plates 74.

As noted above, in the embodiment being described the camming plate 64 is affixed to or formed as part of the housing 30. Camming plate 64 is indicated by broken lines in FIG. 1. The control projection 66 is positioned in housing 30 above and laterally off-set with respect to camming plate 64. The relationship between camming plate 64 and control projection 66 may be best be seen from FIG. 6. The control projection 66 does not interfer with the movements of the catch 60 since it is positioned so as to pass through a longitudinal slot 100 formed in at least one of the guide plates 74 and through a slot 102 in catch 60. The mode of operation of the latching mechanism is such that slots 100 and 102 will be in registration at the time the guide plate 74 containing slot 100 closely approaches the control projection 66.

Operation of the locking mechanism of FIGS. 4-6 will now be described. Presuming that the slider member 34 is in the ejected or cassette removal position, the catch 60 will have assumed a position in cage 58 in which its pins 68, 70 are adjacent the left-hand end of the longitudinal slots 72. T return a cassette to storage, the slider member 34 will be displaced in the direction of camming plate 64, i.e., towards the rear wall 32 of housing 30. Near the end of this insertion displacement of the slider member the edge 78 of a projection 80 of catch 60 will contact an oblique face 82 of camming plate 64. Continued movement of the slider member after this contact has been established will result in projection 80 of catch 60 sliding along face 82 of plate 64, the angles and materials being selected so that there will be insufficient friction to prevent free lateral movement of catch 60. The camming action resulting from cooperation of face 82 and projection 80 will result in pins 68, 70 sliding along the longitudinal slots 72 and thus catch 60 moving to the right as the locking mechanism is shown in FIG. 4. Camming plate 64 is provided with a ramp 84 at the end of oblique face 82. Continued inward movement of the slider member will result in projection 80 moving up ramp 84 as catch 60 pivots on pins 68, 70. A restoring spring 86, formed integrally with catch 60, bears on the cover cross-piece 76 of catch guide 62. Accordingly, as projection 80 is cammed upwardly, a resilient bias in the downward direction will be generated. Continued inward displacement of the slider member will result in projection 80 passing behind a further obliquely oriented face 88 of camming plate 64 whereupon the resilient bias of restoring spring 86 will cause the catch 60 to pivot on pins 68, 70 in the downward direction. This will result in catch 60, and thus the slider member with which it moves, being trapped behind a portion of camming plate 64. Further inward displacement of the slider member will result in the slider member contacting one of the stops. Upon encountering resistance against further movement, the user will release the slider member whereupon the spring 46 will urge the slider member in the direction of ejection. The forwardly directed force provided by spring 46 will cause edge 90 of projection 80 of catch 60 to slide along face 88 of camming plate 64 until the stop face 92 of projection 80 comes to rest against a complementary stop face 94 on the camming plate 64. The slider member is then locked in the inserted position and the locking action is maintained by cooperation between the relatively large abutting surfaces of stop faces 92 and 94. Once locking has been accomplished, further downward pivotal motion of catch 60 is limited by a stop nose 96 which moves in aperture 98 in the rearwardly disposed guide plate 74 of catch guide 62. The above-mentioned longitudinal slot 100, which receives the control projection 66, comprises an extension of opening 98. Upward deflection of catch 60, incidentally, is limited by the spacing between the integral restoring spring 86 and the main body portion of catch 60.

When it is desired to use a cassette or recording media which is accommodated on the slider member 34, the slider member is again pressed inwardly against the stop. This results in a control edge 104 of catch 60 contacting an obliquely oriented face 106 on the control projection 66. As may best be seen from FIG. 5, edge 104 is located above the pins 68 and 70 on catch 60. The contact between edge 104 and face 106 results in catch 60 being displaced to the left as the mechanism is shown in FIG. 4 until the edge 108 of projection 80 is aligned with a rearwardly facing second ramp 110 on camming plate 64. If the slider member is then released, the catch 60 will again be pivoted about the axis of pins 68, 70 as a result of spring 48 urging the slider member in the direction of ejection whereupon the projection 80 will move upwardly over ramp 110. Projection 80 will then move across the top of camming plate 64 and, when the projection clears the camming plate, the restoring spring 86 will cause catch 60 to pivot back to its initial position. The slider member will then continue to move outwardly to its ejected position under the influence of spring 46.

Referring to FIG. 4, it may be seen that a pair of recesses 112 are provided in the cover ledge 76 of catch guide 62. The recesses 112 are located and sized to receive an abuttment projection 114 on restoring spring 86. The recesses 112 are arranged so that the projection 114 will be positioned in respective thereof when the catch is in the locked and unlocked positions. Accordingly, the restoring spring member 86 is stressed only during the times the projection 80 is running across the camming plate 64. Thus, there is no danger of cold flow of the plastic material comprising restoring spring 86.

The above described locking mechanism has a number of advantages. Firstly, a permanently tensioned spring for biasing a component of the mechanism in a preferred position is not necessary. All of the parts of the locking mechanism can thus be manufactured from a plastic material. Further, despite the relatively short travel required for locking and unlocking, relatively large surface areas of the catch projection and camming plate are engaged in the locked condition thereby minimizing the possibility of accidental unlocking. Further, if the catch 60 is partially or completely laterally displaced when the slider member is in the open position, for example as a result of vibration, the locking mechanism will nevertheless function properly when the slider member is pushed inwardly. This advantage results from the fact that each movement of the catch 60 of the locking mechanism of the present invention is associated with its own separate control face on the camming plate 64 and control projection 66 and also with its own control edge or surface on catch 60.

Figure 2:
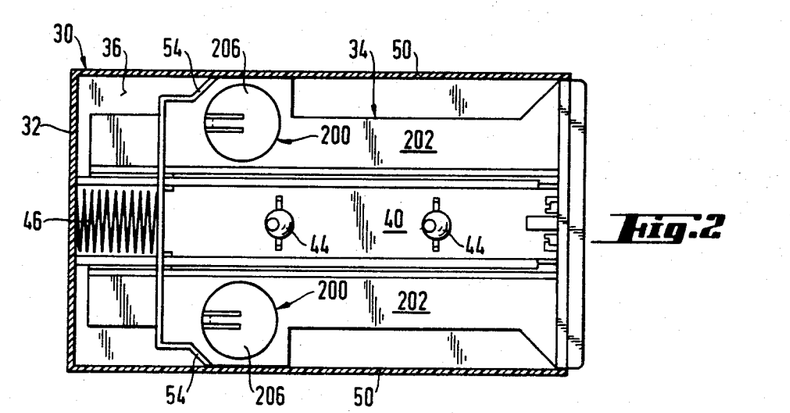
FIG. 2 is a view, similar to FIG. 1, depicting a second embodiment of the present invention.

The container of the embodiment of FIG. 2 corresponds substantially to that of FIG. 1 but employs a somewhat different locking mechanism. Thus, in the embodiment of FIG. 2, a pair of locking devices 200 are employed. The structure and operation of the locking devices 200 may be seen by reference to FIGS. 7-10.

Figure 7:
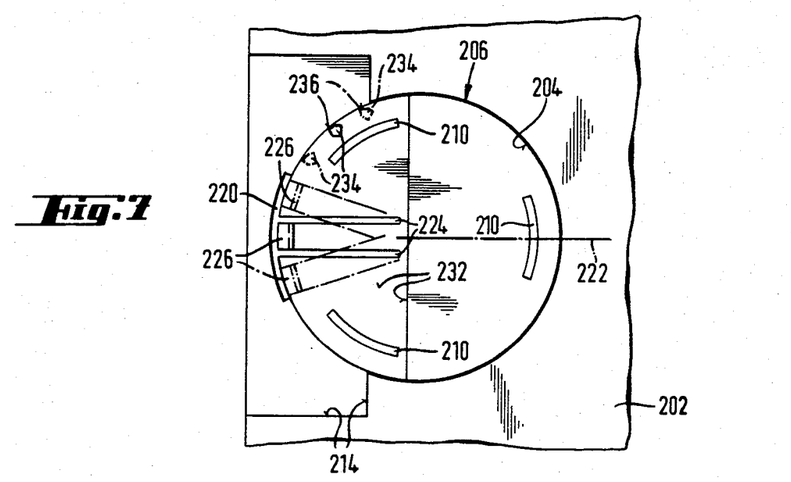
FIG. 7 is an enlarged partial bottom view of the locking mechanism of the embodiment of FIG. 2 without the camming plate.
Figure 8:
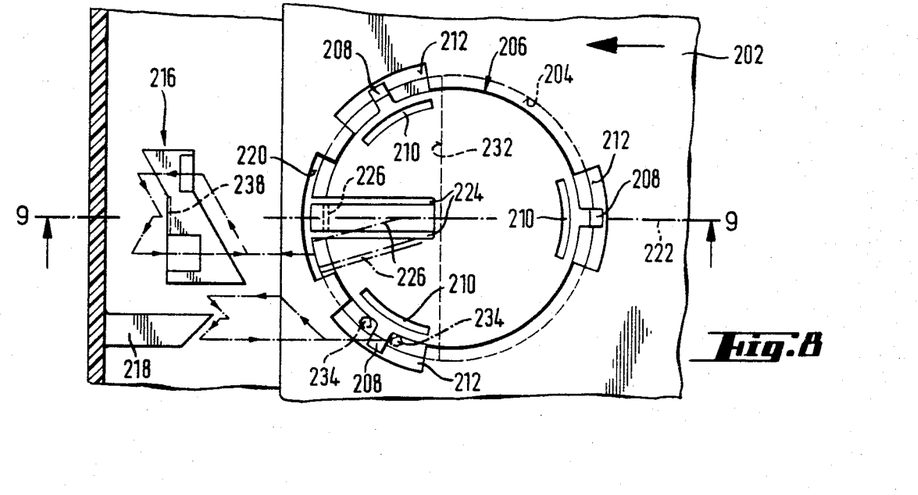
FIG. 8 is a top view of the locking mechanism of FIG. 7, FIG. 8 depicting the mechanism in the unlocked condition.
Figure 9:
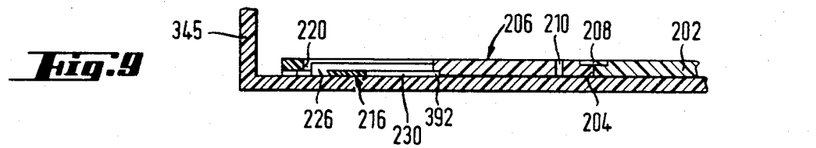
FIG. 9 is a cross-sectional view, taken along line 9—9 of FIG. 8, of the locking mechanism of FIGS. 7 and 8.
Figure 10:
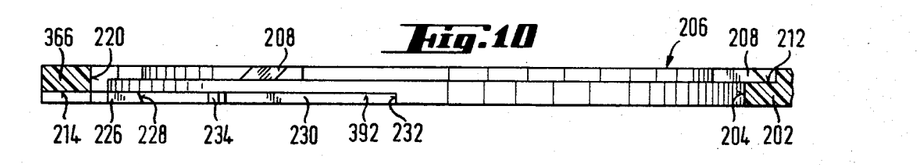
FIG. 10 is a partial, enlarged view similar to FIG. 9.

Referring now jointly to FIGS. 2 and 7-10, the slider member 34 has a unitary base 202. The base 202 has a pair of circular aperture 204 therein. A catch 206 is inserted in each of the apertures 204. The catches 206 are configured and mounted so that they can be rotated through a limited angle. Continuing to refer to FIGS. 7-10, which show a single one of the catches 206, three "claws" or guide members 208 are integrally formed with and extend radially outwardly from the upper side of the catch 206. The claws 208 are off-set from one another by 120°. The catch 206 is relieved, by the provision of slots 210 therein, so that the "claws" 208 may be sprung inwardly when the catch is inserted into an aperture 204. After insertion of the catch 206 in aperture 204, each of "claws" 208 drops into an arcuate recess 212 which is formed on the upper side of the base of the slider member 34. The length of the arcuate recesses 212 is determined by the maximum angle of rotation desired for catch 206. The catch 206 is supported by inwardly projecting circumferential portions of the aperture 204 in slider member 34 which are located between the recesses 212. A further recess 214, which may be seen from FIGS. 7 and 10, is provided on the underside of base 202 of slider member 34. The depth of recess 214 is commensurate with the height of a camming plate 216 and a control projection 218 which are provided on the base 36 of housing 30. The length and width of recess 214 is indicated on FIG. 7.

The base 202 of slider member 34 is also provided with an aperture 220 in the region between those two of recesses 212 that are positioned at the opposite sides of the central plane 222 of the slider member. In the region of aperture 220, the catch 206 is provided with a pair of slots 224 which cooperate to define therebetween a resilient catch which includes a catch projection 226. The catch projection 226 is undercut as indicated at 228. A space 230, corresponding to the height of camming plate 216 and control projection 218, is provided under the resilient catch. The space 230 is limited, at a first end, by a shoulder 232. In addition, a control lug 234 is formed integrally with and on the underside of catch 206. The control lug 234 has a control edge 236.

The camming plate 216 and the control projection 218 respectively cooperate with the control edges of the catch projection 226 and the control edge 236 of the control lug 234. As schematically indicated on FIG. 8, this results in the same pattern of motion as described above with respect to the locking mechanism of FIGS. 4–6. In the case of the mechanism of FIGS. 7–10, however, the catch 206 turns first in the clockwise direction and then in the counter-clockwise direction and the catch projection 226 is deflected in the direction of the axis of rotation of catch 206 when it runs over the ramps of the camming plate 216.

The undercut 228 of catch projection 226 cooperates with a complementary undercut 238 on camming plate 216 to prevent the projection 226 from sliding off the camming plate when in the locked position and also insures that the catch projection will not, as a result of forces acting thereon, deform as a result of cold flow.

As will be obvious to those skilled in the art from the above discussion, the embodiment of FIGS. 2 and 7–10 enhances the locking function without requiring any additional space in the container when compared to prior art techniques. Further, as in the embodiment of FIGS. 1 and 4–6, the mechanism can be manufactured from molded plastic parts.

Figure 11:
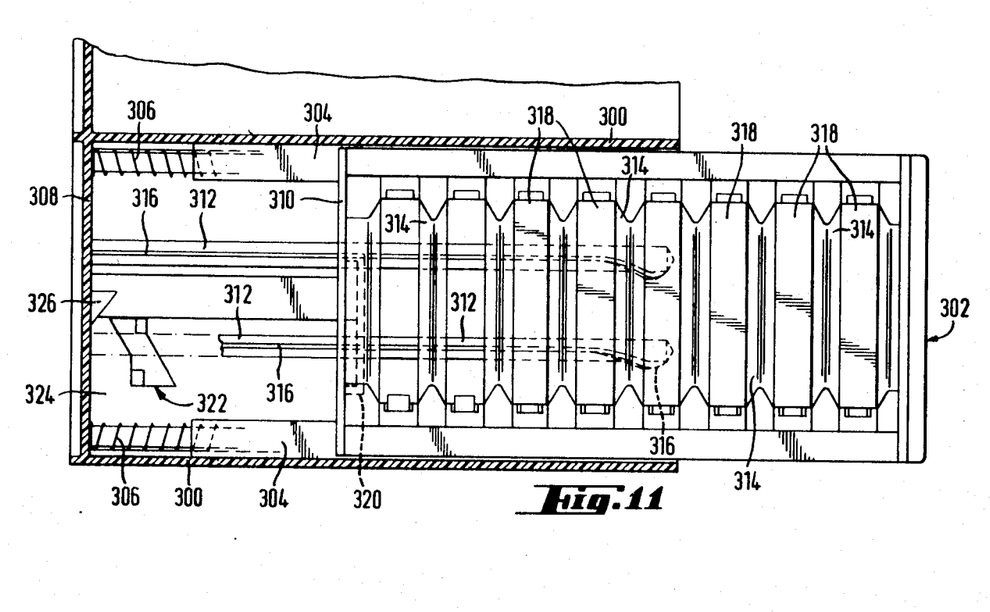
FIG. 11 is a cross-sectional plan view of a container for a plurality of microcassettes shown with the transport slider member in the partially opened position.

FIG. 11 shows a further embodiment of a recording media storage container or magazine in accordance with the present invention. The apparatus of FIG. 11 includes a housing 330. A transport slider member 302 is mounted in housing 330 and is designed to accommodate a plurality of small magnetic tape cassettes, i.e., so-called microcassettes. These microcassettes will be supported, standing next to one another on the ends thereof which oppose the tape head, in individual receiving compartments. In the embodiment of FIG. 11 the transport slider member 302 can be removed completely from the housing. In order to permit such removal, the housing 330 is provided with parallel, movable lateral rails 304 on which the slider member 302 is mounted. The rails 304 may be pulled out to a point which corresponds to approximately half the depth of the housing. The slider member 302, in turn, can be pulled out by approximately the same distance. A helical pressure spring 306 passes through each of rails 304. The springs 306 extend between the rear wall 308 of housing 330 and the rear wall 310 of slider member 302 and bias the slider member in the ejection direction. A pair of pegs 312 extend from housing rear wall 308 through the rear wall 310 of slider member 302. The pegs 312 pass through the separating walls 314 which define the individual cassette receiving compartments in the slider member. The pegs 312 are provided with vanes 316 which engage, and thus lock, the tape winding hubs of cassettes which have been inserted in the slider member. In FIG. 11 a plurality of cassettes are indicated by reference numerals 318.

The locking mechanism of the apparatus of FIG. 11 is identical to that of the embodiment of FIGS. 1 and 4–6. Thus, a cage 320 is provided in the rear wall of slider member 302 for receiving a catch. Also, a camming plate 322 is provided at the base 324 of housing 330 and a control projection 326 is provided at the rear wall 308 of the housing.

Figure 3:
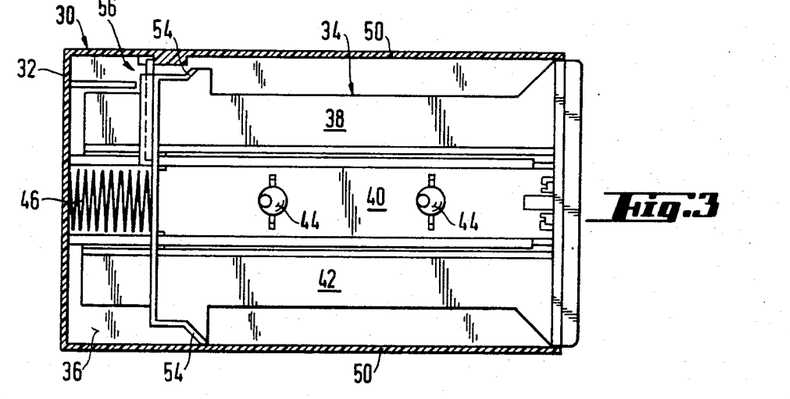
FIG. 3 is a view, similar to FIGS. 1 and 2, depicting a third embodiment of the present invention.
Figure 12:
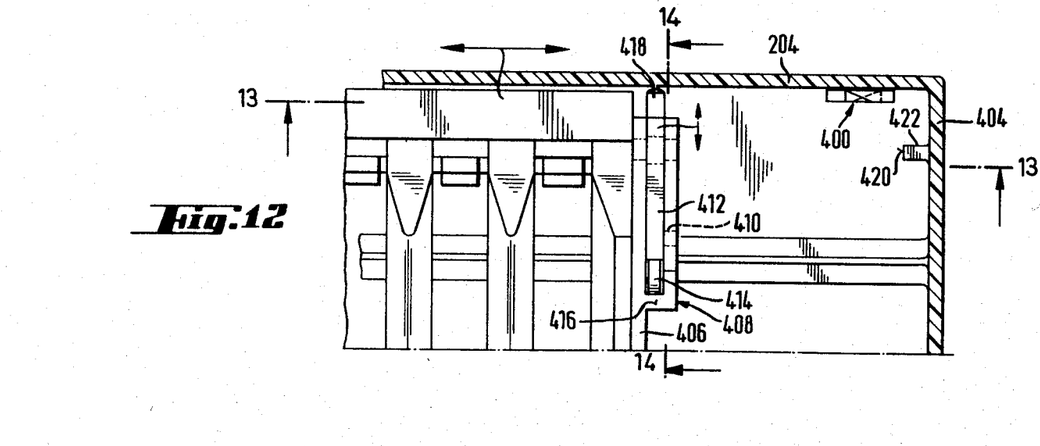
FIG. 12 is a partial view similar to FIG. 11 and depicting the locking mechanism in a different position.
Figure 13:
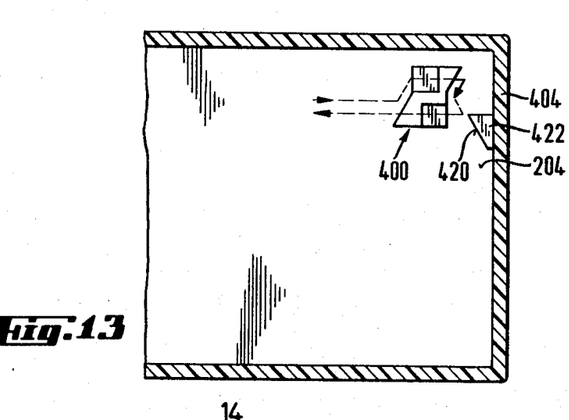
FIG. 13 is a partial internal view taken in the direction of arrow 13 of FIG. 12.
Figure 14:
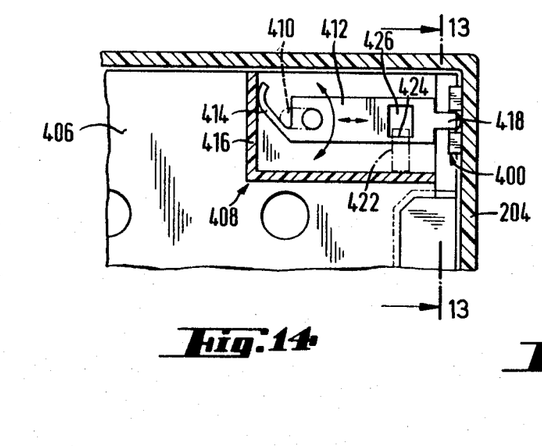
FIG. 14 is a cross-sectional view taken along line 14—14 of FIG. 12.
Figure 15:
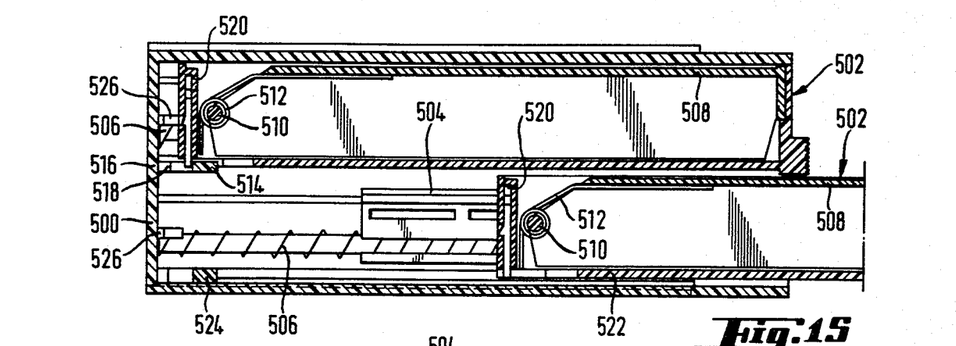
FIG. 15 is a cross-sectional side elevation view of a container for compact discs, the container of FIG. 15 having two slider transport members and one of these members being shown in the partly open condition.
Figure 16:
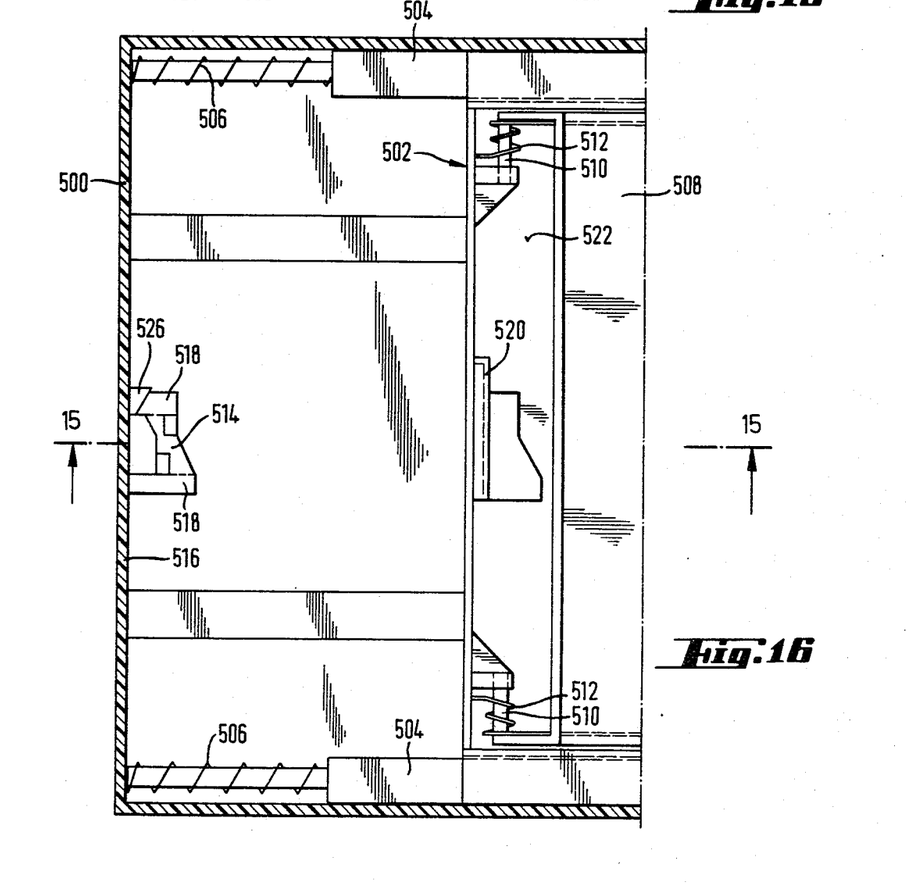
FIG. 16 is a cross-sectional top plan view showing the lower transport slider mechanism of the apparatus of FIG. 15.

FIGS. 12–14 depict a further slider member locking mechanism in accordance with the present invention. For purposes of explanation, the locking mechanism shown in FIGS. 12–14 may be considered to be part of the plural microcassette receiving magazine of FIG. 11 although this locking mechanism may, for example, also be employed in the container for compact cassettes depicted in FIG. 3.

Referring now to FIGS. 12–14, the camming plate of the locking mechanism has been indicated generally at 400. Camming plate 400 is formed on the side wall 204 of the container housing. The control projection 422 is formed integrally with the rear wall 404 of the housing. The cage for the movable catch 412 has been indicated generally at 408 and is formed in the rear wall 406 of the slider member. The catch 412 is supported so that is movable, i.e., both laterally slidable and pivotable, in an elongated slots 410 in cage 408. The catch 412 includes an integral leaf spring member 414 which may best be seen from FIG. 14. Spring member 414 contacts the end wall 416 of cage 408. At the end disposed oppositely to spring member 414, catch 412 is provided with a catch projection 418 which cooperates with the camming plate 400. The oblique face 420 of control projection 422 passes through an opening, not shown, in cage 408 and cooperates with a catch control edge 424 defined by an aperture 426 in catch 412.

The mode of operation of the locking mechanism of FIGS. 12–14 corresponds to that described above in the discussion of FIGS. 4–6. The motion of the catch 412 is indicated schematically on FIG. 13 and it is particularly to be noted that the integral spring member 414 is in tension only during those times that the catch projection 418 is riding over the camming plate 400.

FIGS. 15–18 disclose a magazine or container for receiving and storing compact discs. This container includes a housing 500 which accommodates a pair of stacked slider members which have been indicated generally at 502. Each of the slider members 502 is supported in housing 500 so that it can slide, via telescopic rails 504, in a manner similar to that described above in the discussion of FIG. 11. Similarly, the mounting and operation of the ejection springs 506 of the embodiment of FIGS. 15–18 is analogous to that described above with respect to FIG. 11. Each of slider members 502 is provided with a hinged lid 508. The lids are connected to the slider members by means of bolts 510 and a collar leg spring 512 on one of the bolts biases each lid towards the open position. Pockets, which open in the manner of a concertina when the lid 508 pivots upwardly will be suspended between the base of the slider member and the lid in most applications.

Figure 17:
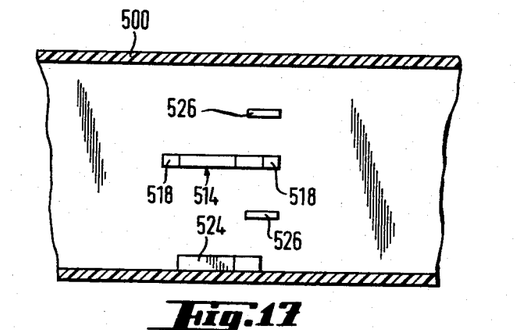
FIG. 17 is a partial view of the inside of the rear wall of the housing of the appartus of FIG. 15.
Figure 18:
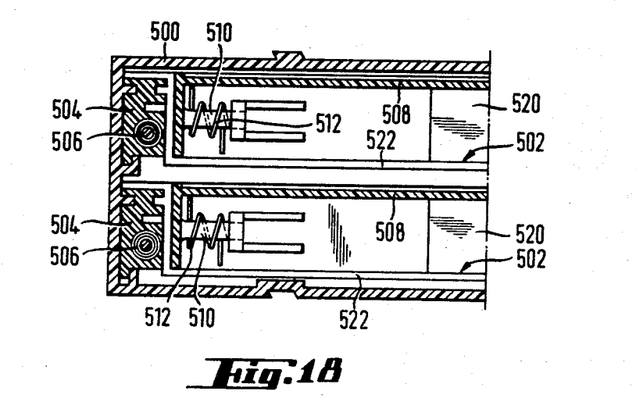
FIG. 18 is a partial vertical section taken perpendicular to the direction of movement of the transport slider members of the apparatus of FIGS. 15-17.

The locking of the slider members 502 in housing 500 is effected by means of a locking mechanism of the type shown in FIGS. 4–6. However, since there is no housing base beneath the upper one of slider members 502, the camming plate 514 associated therewith is attached to the rear wall 516 of the housing at the appropriate height. The camming plate 514 of the upper locking mechanism is supported by a pair of arms 518 as may best be seen from FIG. 16. The base 522 of each of the slider members is provided, in the region beneath the cage 502 in which the catch moves, with a recess. In the case of the upper slider member this recess receives camming plate 514 and its support arms 518. Referring to FIG. 17, the arrangement of the lower camming plate 524, as well as the arrangement of both of the control projections 526 is the same as in the embodiment of FIGS. 4–6.

Figures 19, 20:
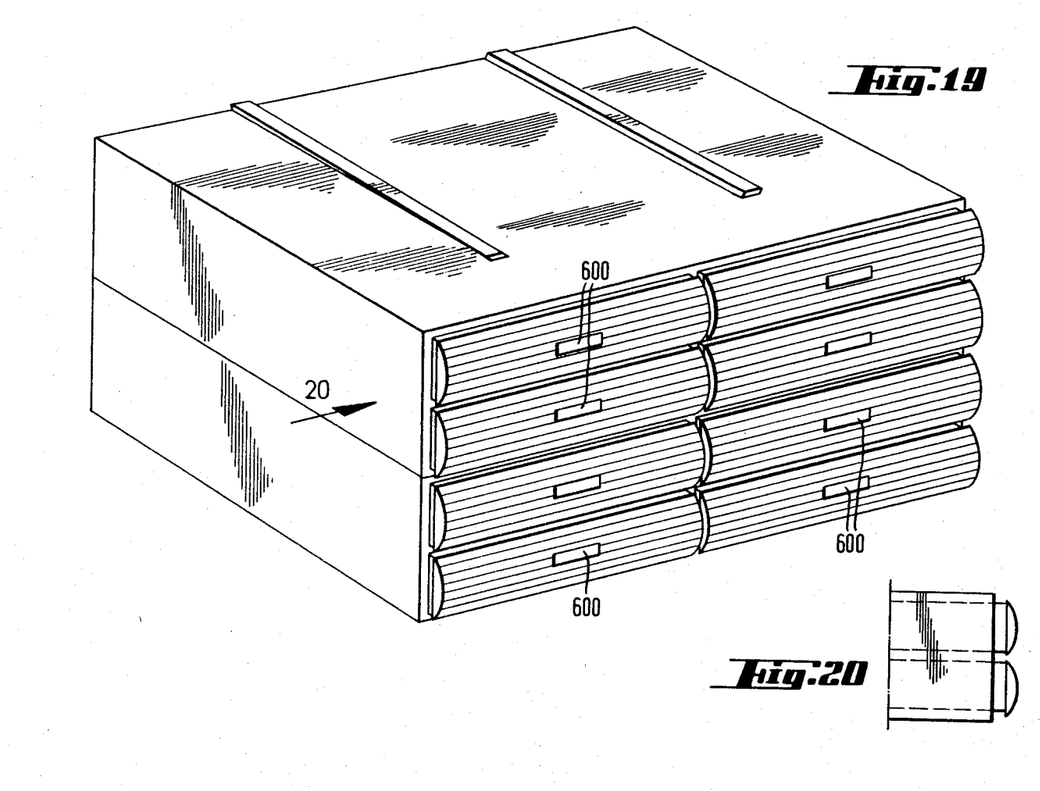
FIG. 19 is a perspective view of a storage container having eight transport slider members for accommodating recording media, the apparatus of FIG. 19 employing the individual housing/slider subassemblies of any of the embodiments of FIGS. 1-3.
FIG. 20 is a partial view of the apparatus of FIG. 19 taken in the direction of arrow 20.

FIG. 19 is a perspective view of two positively locked containers. Each of these containers has a housing which includes four slider members. The arrangement of FIG. 19 thus constitutes a magazine for storing compact cassettes. The front walls of the slider members are provided with openings 600 which receive identifying labels. These front walls have rounded contours which are comfortable to use and which reduce the possibility of impact injury in the case where the magazine is installed in a motor vehicle. As may be seen from the partial view comprising FIG. 20, the slider members project from the housing a short distance beyond the front edge thereof when in the inserted and locked position. The spacing of the slider members from the housing in the locked position corresponds to the release travel of the locking mechanism.

In all of the above-described embodiments, the slider members are resiliently biased in the opening or ejection direction. The force exerted by the ejection spring generates torques which act on the housing and on the transport slider member at the point of rotation defined by the locking mechanism. The present invention minimizes or eliminates these torques by selecting a lever arm that is as short as possible. This, in turn, minimizes the possibility of cold flow of the plastic material from which the magazine is fabricated, especially at relatively high temperatures, and thus minimizes the possibility of permanent deformation of components of the magazine.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Recording media storage apparatus comprising:
   housing means;
   transport slider means for accommodating recording media, said slider means being movable along a linear path for conveying the recording media from a storage position in which it is completely enclosed in said housing means and a removal position in which it is accessible for removal from said slider means;
   spring means for biasing said transport slider means toward the removal position; and
   locking means for retaining said transport slider means in the storage position against the bias of said spring means, said locking means including cooperating locking elements on said housing means and said slider means which are responsive to movement of said slider means in a first direction to alternately lock and unlock said locking means, said locking elements comprising:
      at least first coupling means, said coupling means including a first movable coupling member, said coupling member being supported along the path of movement of said transport slider means; and
      cam means, said cam means being supported in the direction of movement of said transport slider means and cooperating with said coupling means coupling member to establish a locked position of said transport slider means, said coupling member and cam means being movable relative to one another and being urged together in a second direction opposite to said first direction of motion of said slider means by said spring means when said locking means is in the locked position, said cam means being shaped to cause disengagement of said coupling means and said cam means upon movement of said transport slider means in said first direction when said locking means is in the locked condition.

2. The apparatus of claim 1 wherein said housing means includes a rear wall toward which said transport slider means is displaced in said first direction, said transport slider means has a rear wall which is parallel to said housing means rear wall, and wherein:
   said coupling member is supported on one of said rear walls; and
   said cam means is supported on the other of said rear walls.

3. The apparatus of claim 2 wherein said cam means includes five control surfaces and wherein the movements of said coupling member is determined by contact between said coupling member and said control surfaces.

4. The apparatus of claim 1 wherein said cam means is affixed to said housing means.

5. The apparatus of claim 2 wherein said cam means is affixed to said housing means.

6. The apparatus of claim 5 wherein said cam means extends into said housing means from said rear wall thereof.

7. The apparatus of claim 4 wherein said cam means comprises:
   a camming plate; and
   a control projection.

8. The apparatus of claim 7 wherein housing means has a plurality of walls and wherein said camming plate extends into said housing means from a first wall of said housing means and wherein said control projection extends into said housing means from a second wall of said housing means.

9. The apparatus of claim 8 wherein said said housing means includes a rear wall, said housing means first wall comprises a side wall which extends perpendicularly with respect to said housing means rear wall.

10. The apparatus of claim 8 wherein said housing means includes a rear wall and said housing means first wall comprises a base member which extends perpendicularly with respect to said rear wall and wherein said housing means second wall is said rear wall.

11. The apparatus of claim 7 wherein said housing means includes a rear wall which defines a plane which is generally transverse to said path of movement of said slider means and wherein both of said camming plate and control projection extend into said housing means from said rear wall thereof.

12. The apparatus of claim 1 wherein said coupling member and cam means are mounted on relatively movable parallel walls.

13. The apparatus of claim 1 wherein said cam means has a plurality of control surfaces which cause at lease a part of said coupling member to follow a first non-linear path of motion during locking and to follow a second non-linear path of motion during unlocking.

14. The apparatus of claim 13 wherein said coupling member includes a locking projection having a flat locking surface and wherein said cam means includes a locking surface complementary to said locking projection locking surface.

15. The apparatus of claim 13 wherein said coupling member has a locking projection and wherein one of said cam means control surfaces cause said coupling member locking projection to be moved on a path which produces a component of motion of said locking projection which is transverse to said first direction of motion of said transport slider means.

16. The apparatus of claim 15 wherein said coupling means is mounted on said transport slider means and wherein said one of said cam means control surfaces causes said locking projection to move along a path portion which produces a second component of motion which is transverse to said first component of motion.

17. The apparatus of claim 1 wherein said coupling member includes:
means for generating a resilient bias in response to movements thereof in a direction transverse to said first direction of motion of said transport slider means.

18. The apparatus of claim 16 wherein said coupling member includes:
means for generating a resilient bias in response to movements of said locking projection in a direction transverse to said first direction of motion of said transport slider means.

19. The apparatus of claim 1 wherein said coupling means is mounted on said transport slider means for at least partial motion of said coupling member in both translatory and rotatable directions, said motion in both directions including a component which is transverse to the direction of movement of said transport slider means.

20. The apparatus of claim 15 wherein said coupling member is mounted on said transport slider means in such a manner as to make said coupling member rotatable about an axis transverse to a plane defined by the path of motion of said transport slider means.

21. The apparatus of claim 20 wherein said locking projection is guided by said cam means on two circular arcs having axes that are perpendicular to each other.

22. The apparatus of claim 15 wherein said locking projection is provided with an undercut and wherein said cam means has a complementary undercut for engaging said locking projection.

23. The apparatus of claim 1 wherein said coupling means comprises:
cage means, said cage means having a pair of spacially displaced walls which define therebetween an elongated opening which extends in a direction transverse to the path of motion of said transport slider means, said cage means walls being provided with guide surfaces; and
a coupling member, said coupling member being positioned between said cage means walls, said coupling member being supported from said guide surfaces so as to be movable along said opening and to be rotatable.

24. The apparatus of claim 15 wherein said coupling member comprises a circular disc and wherein said locking projection is formed on a resilient portion of said disc, said resilient portion being capable of deflection out of a plane defined by said disc.

25. The apparatus of claim 24 wherein said disc is rotatable in two opposite directions.

26. The apparatus of claim 23 wherein said coupling member includes integral pivot pins which support said coupling member for movement.

27. The apparatus of claim 25 wherein said coupling member includes stops for limiting the rotational motion thereof.

28. The apparatus of claim 1 wherein said transport slider means has a front wall provided with an actuating bar.

29. The apparatus of claim 1 wherein said transport slider means has a front wall which comprises an actuator member.

30. The apparatus of claim 1 wherein said transport slider means front wall has a rounded contour.

31. The apparatus of claim 13 wherein said cam means comprises:
a camming plate; and
a control projection.

32. The apparatus of claim 31 wherein said housing means comprises a rear wall toward which said transport slider means is displaced in said first direction, said transport slider means has a rear wall which is parallel to said housing means rear wall, and wherein:
said coupling means is supported on one of said rear walls; and
said cam means is supported on the other of said rear walls.

33. The apparatus of claim 32 wherein said coupling means coupling member has a locking projection extending therefrom and wherein one of said cam means control surfaces causes said coupling member locking projection to be moved on a path portion including a component of motion of at least part of said coupling member which is transverse to said first direction of motion of said transport slider means.

34. The apparatus of claim 33 wherein said coupling member further includes:
means for generating a resilient bias in response to movements said locking projection in a direction transverse to said first direction of motion of said transport slider means.

35. The apparatus of claim 34 wherein said coupling means comprises:
cage means, said cage means having a pair of spacially displaced walls which define therebetween a elongated opening which extends in a direction transverse to the path of motion of said transport slider means, said cage means walls being provided with guide surfaces; and a coupling member, said coupling member having said locking projection and bias generating means integral therewith and being positioned between said cage means walls, said coupling member being supported from said guide surfaces so as to be movable along said opening and rotatable.

36. The apparatus of claim 35 wherein said cam means is affixed to said housing means.

* * * * *